United States Patent Office 3,493,598
Patented Feb. 3, 1970

3,493,598
CYANOETHYL ETHERS OF PROPANEDIOLS
Viktor Papesch, Morton Grove, Ill., assignor to G. D. Searle & Co., Chicago, Ill., a corporation of Delaware
No Drawing. Filed Oct. 7, 1966, Ser. No. 584,973
Int. Cl. C07c 121/00; A61k 27/00
U.S. Cl. 260—465                                                  6 Claims

ABSTRACT OF THE DISCLOSURE

Mono- and bis-cyanoethyl ethers of 2,2-disubstituted propane-1,3-diols are described herein together with esters of the mono-ethers and also amides corresponding to the nitriles. The compounds are prepared by the cyanoethylation of the appropriate 2,2-disubstituted propane-1,3-diol. Where desired, the resultant product can be esterified or hydrolyzed to the amide. The compounds involved are useful as anti-inflammatory agents and anti-fungal agents.

---

The present invention relates to a group of compounds which are cyanoethylated derivatives of propanediols. The invention also relates to compounds derived from this type of ether. In particular, it relates to compounds having the following general formula

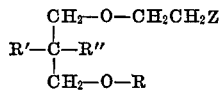

wherein R is selected from the group consisting of hydrogen, cyanoethyl, alkanoyl, and benzoyl; R' is lower alkyl; R" is selected from the group consisting of lower alkyl and phenyl; and Z is selected from the group consisting of cyano and carbamoyl.

The lower alkyl radicals referred to above contain up to six carbon atoms and are exemplified by radicals such as methyl, ethyl, propyl, butyl, pentyl, and hexyl. The lower alkanoyl radicals referred to above likewise contain up to six carbon atoms and can be exemplified by radicals such as acetyl, propionyl, and butyryl.

The compounds of this invention are useful because of their pharmacological properties. In particular, the present compounds possess anti-inflammatory activity. This is demonstrated by their phenylbutazone-like effect on edematous conditions. In addition, these compounds are antifungal agents. Thus, they inhibit the growth of fungi such as *Candida albicans* and *Trichophyton mentagrophytes*.

The compounds of the present invention are prepared from the appropriately substituted propanediol and acrylonitrile. The reaction is generally carried out at reflux in a solvent mixture consisting of water and an organic base such as pyridine. A quaternary ammonium base can additionally be present in the reaction mixture to serve as a catalyst. One base particularly useful as a catalyst is trimethylbenzylammonium hydroxide.

The compounds of the present invention which are esters are prepared from the appropriate alcohol of the formula

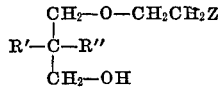

wherein R', R", and Z are defined as above. This alcohol is reacted with an appropriate acylating agent such as acetic anhydride, acetyl chloride, or benzoyl chloride to give the desired esters.

Those compounds containing an amide structure can be obtained by the acidic or basic hydrolysis of the appropriate ntirile.

The compounds which constitute this invention and the preparation of these compounds are illustrated by the following examples which should not be construed as limiting the invention in spirit or in scope. In these examples, quantities by weight are indicated in grams, quantities by volume are indicated in milliliters, and temperatures are indicated in degrees centigrade (° C.).

EXAMPLE 1

A mixture of 40 grams of 2-methyl-2-propyl-1,3-propanediol, 40 ml. of 50% by volume pyridine-water, and 40 ml. of acrylonitrile is heated to the boiling point and 3 ml. of trimethylbenzylammonium hydroxide is added. An exothermic reaction takes place and the mixture is then refluxed for 7 hours. Volatile material is removed from the mixture by distillation under reduced pressure and the resultant residue is mixed with water several times and the water is distilled off each time. The residue is then dissolved in a solution of 20% ethyl acetate in benzene and chromatographed on a silica gel column. The column is eluted with increasing concentrations of ethyl acetate in benzene. The fraction eluted with 20% ethyl acetate in benzene is collected and the solvent is then evaporated to give 2-methyl-2-propyl-1,3-propanediol bis-2-cyanoethyl ether.

The column described above is further eluted and the fraction eluted with 40% ethyl acetate in benzene is collected and the solvent is evaporated to give 2-methyl-2-propyl-1,3-propanediol mono-2-cyanoethyl ether.

The chromatographic column described above is finally eluted with acetone. The solvent is evaporated from the material obtained and the residue is redissolved in benzene and chromatographed with methanol in ethyl acetate. The fraction obtained by elution with 10% methanol in ethyl acetate is collected and the solvent is evaporated to leave 2 - methyl - 2 - propyl - 1,3 - propanediol mono - 2 - carbamoylethyl ether as the residual liquid.

EXAMPLE 2

A mixture of 40 grams of 2-ethyl-2-phenyl-1,3-propanediol, 40 ml. of 50% by volume pyridine-water, 40 ml. of acrylonitrile, and 3 ml. of trimethylbenzylammonium hydroxide is heated on a steam bath for 7 hours. The resultant mixture is then distilled under reduced pressure to remove readily volatile substances and leave a residual syrup. Absolute ethanol is added to this residue and the distillation is repeated. This treatment with ethanol is repeated three additional times. The resultant residue is finally dissolved in benzene and chromatographed on a silica gel column. The column is eluted with increasing quantities of ethyl acetate in benzene; the fraction eluted with 10% ethyl acetate in benzene is collected and the solvent is evaporated to leave a residue which is 2-ethyl-2-phenyl-1,3-propanediol bis - 2 - cyanoethyl ether. This compound has the following formula

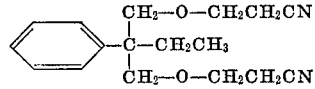

EXAMPLE 3

A mixture of 42 grams of 2-ethyl-2-isopentyl-1,3-propanediol, 70 ml. of a 72% pyridine in water mixture, 40 ml. of acrylonitrile, and 3 ml. of trimethylbenzylammonium hydroxide is heated on a steam bath for 7 hours. Volatile material is removed from the mixture by distillation under reduced pressure and a residual syrup is obtained. Absolute ethanol is added to this residue and the distillation is repeated. Then, the treatment with ethanol is repeated three additional itmes. The residue is finally dissolved in benzene and chromatographed on a silica gel column. The column is eluted with increasing quantities of ethyl acetate in benzene. The fraction eluted with 10% ethyl acetate in benzene is collected and the solvent is evaporated to leave 2-ethyl-2-isopentyl-1,3-propanediol bis-2-cyanoethyl ether.

Elution of the column is continued and the fraction obtained by elution with 30% ethyl acetate in benzene is collected and the solvent is evaporated to leave a residual liquid which is 2-ethyl-2-isopentyl-1,3-propanediol mono-2-cyanoethyl ether. This compound has the following formula

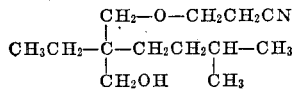

EXAMPLE 4

Mono-2-cyanoethyl ether of 2-methyl-2-propyl-1,3-propanediol is heated with excess benzoyl chloride, acetic anhydride, and propionyl chloride to give the corresponding benzoate, acetate, and propionate, respectively, after removal of the excess acylating agent.

EXAMPLE 5

2,2-dimethyl-1,3-propanediol is reacted with acrylonitrile according to the procedure described in Example 1. The products obtained are 2,2-dimethyl-1,3-propanediol bis-2-cyanoethyl ether and 2,2-dimethyl-1,3-propanediol mono-2-cyanoethyl ether.

What is claimed is:
1. A compound of the formula

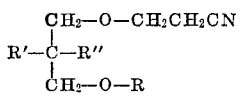

wherein R is selected from the group consisting of hydrogen and cyanoethyl; R' is lower alkyl containing up to six carbon atoms; and R" is selected from the group consisting of lower alkyl containing from three to six carbon atoms and phenyl.

2. A compound according to claim 1 which has the formula

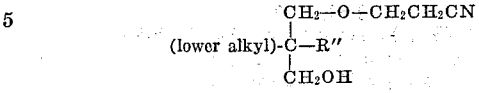

wherein lower alkyl contains up to six carbon atoms and R" is lower alkyl containing from three to six carbon atoms.

3. A compound according to claim 1 which is 2-methyl-2-propyl-1,3-propanediol bis-2-cyanoethyl ether.

4. A compound according to claim 1 which is 2-methyl-2-propyl-1,3-propanediol mono-2-cyanoethyl ether.

5. A compound according to claim 1 which is 2-ethyl-2-isopentyl-1,3-propanediol mono-2-cyanoethyl ether.

6. A compound according to claim 1 which is 2-ethyl-2-phenyl-1,3-propanediol bis-2-cyanoethyl ether.

References Cited

UNITED STATES PATENTS

| 2,359,708 | 10/1944 | Bruson. | |
| 2,437,905 | 3/1948 | Bruson | 260—465 X |
| 2,809,988 | 10/1957 | Heininger | 260—465 X |
| 2,836,613 | 5/1958 | Heininger | 260—465 X |

FOREIGN PATENTS

| 447,382 | 3/1948 | Canada. |
| 674,307 | 11/1963 | Canada. |

CHARLES B. PARKER, Primary Examiner

S. T. LAWRENCE III, Assistant Examiner

U.S. Cl. X.R.

260—465.6, 473, 484, 559, 561, 999